Dec. 12, 1967   C. E. GRAWEY ET AL   3,357,456
HOSE AND METHOD OF MANUFACTURE
Filed Aug. 30, 1966   3 Sheets-Sheet 1

INVENTORS
CHARLES E. GRAWEY
ROBERT W. UNTZ
BY
ATTORNEYS

Dec. 12, 1967   C. E. GRAWEY ET AL   3,357,456
HOSE AND METHOD OF MANUFACTURE
Filed Aug. 30, 1966
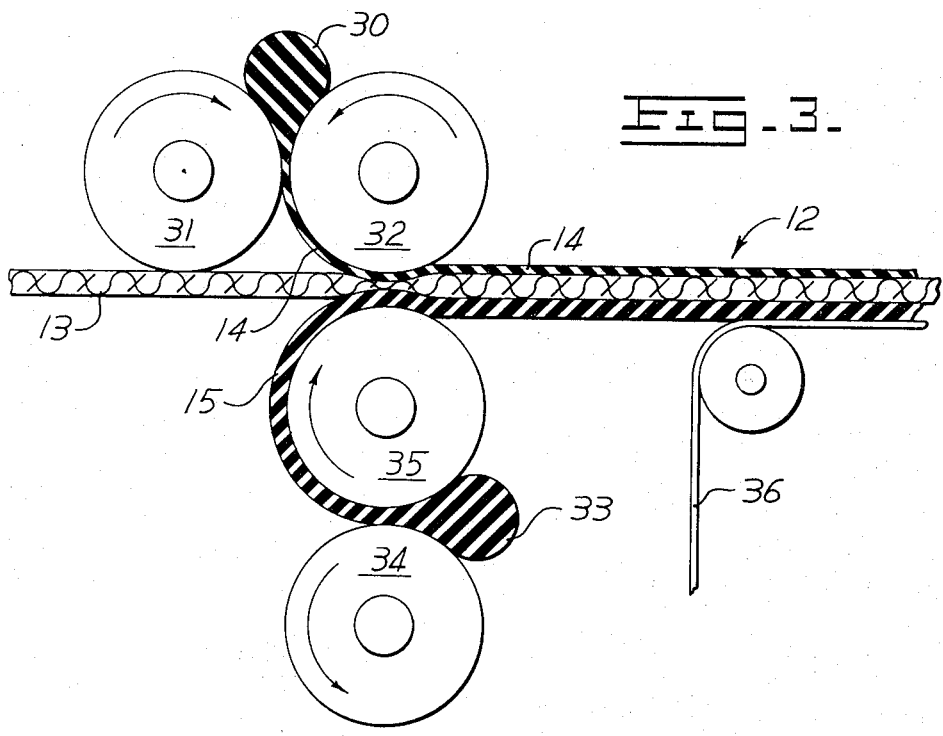
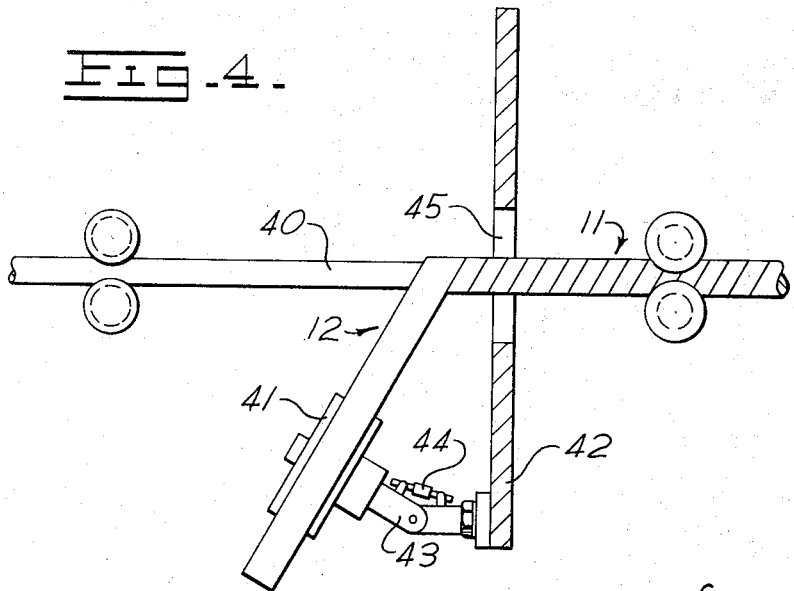
INVENTORS
CHARLES E. GRAWEY
ROBERT W. UNTZ
BY
ATTORNEYS Dec. 12, 1967 C. E. GRAWEY ET AL 3,357,456
HOSE AND METHOD OF MANUFACTURE
Filed Aug. 30, 1966 3 Sheets-Sheet 3
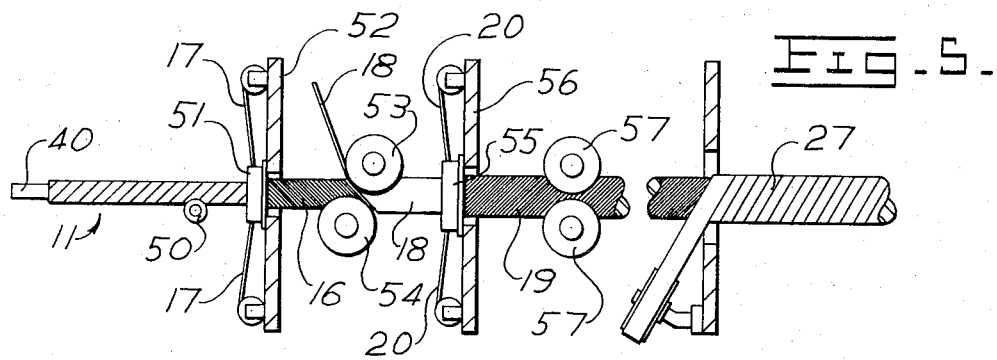
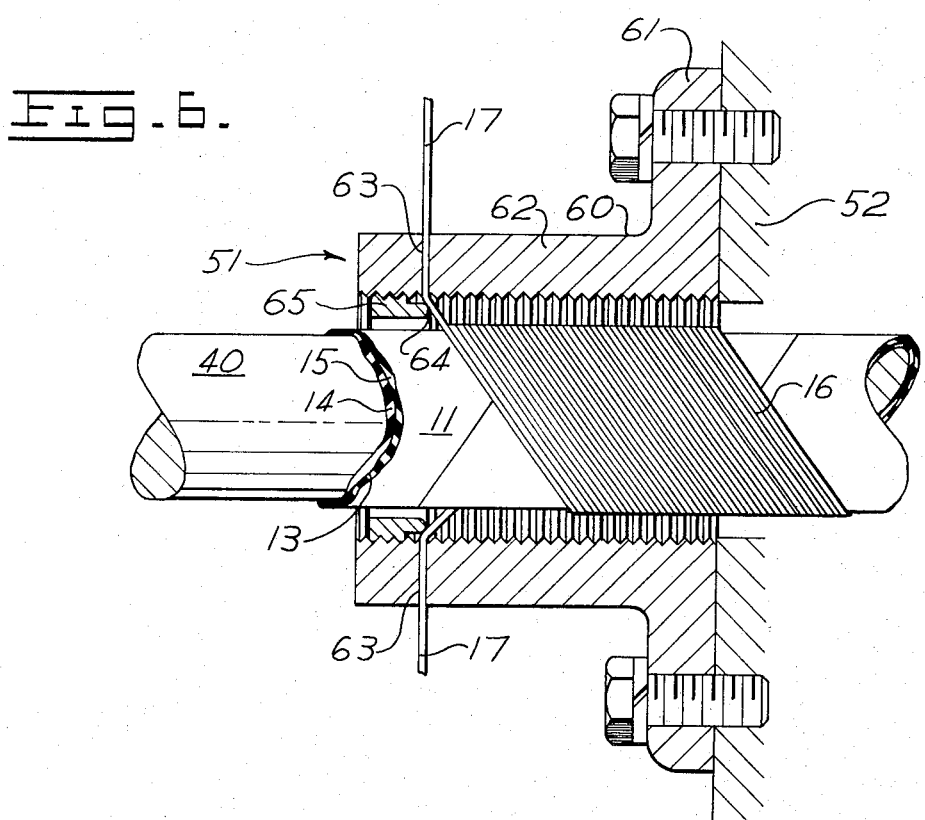
INVENTORS
CHARLES E. GRAWEY
ROBERT W. UNTZ
BY
Fryer, Tjensvold, Feix & Phillips
ATTORNEYS

United States Patent Office 3,357,456
Patented Dec. 12, 1967

3,357,456
HOSE AND METHOD OF MANUFACTURE
Charles E. Grawey, Peoria, and Robert W. Untz, Hanna City, Ill., assignors to Caterpillar Tractor Co., Peoria, Ill., a corporation of California
Filed Aug. 30, 1966, Ser. No. 576,035
10 Claims. (Cl. 138—127)

ABSTRACT OF THE DISCLOSURE

A flexible, high-pressure, wire-reinforced hose with superior performance can be fabricated by using a tape wrapped and lapped to form its innermost core, which tape is composed of several thin layers of uncured elastomer with a fabric layer sandwiched therebetween, subsequently winding several plies of reinforcing wires on this core at angles of approximately 54° 44′ relative to the hose axis so that the wires in alternate plies are crossed relative to those in adjacent plies, and vulcanizing the hose as a unit.

---

This invention relates to flexible, reinforced hose and more particularly to an improved construction for wire-reinforced rubber hose which is especially suited for high pressure and high temperature hydraulic circuits.

A trend in hydraulic systems is toward higher pressures to keep the size of the hydraulic motors small and still develop the requisite power for accomplishing a given task. Further, the smaller, higher pressure systems usually provide quicker response. This is especially true in implement circuits such as found in loaders and earth-moving scrapers, and it is not unusual to find hydraulic circuits in such equipment operating at pressures well in excess of 3,000 p.s.i. Pressure peaks and surges may well be in excess of 15,000 p.s.i.

Often hydraulic circuits operating at these high pressures are disposed on portions of equipment that are articulated relative to one another, which requires that the circuits have a flexible coupling or hose between moving parts. Generally, high pressure hydraulic hoses are used to provide the needed flexibility in the circuit.

Hose customarily used in high pressure applications is wire-reinforced rubber hose, such as disclosed in U.S. Patent No. 2,128,814 issued to Gish, U.S. Patent No. 2,156,889 issued to Pierce and U.S. Patent No. 3,212,528 issued to Haas. Normally the hose disclosed in these patents is constructed with a relatively soft extruded cylindrical uncured rubber core which is then wrapped or covered with a protective fabric tape or braid to protect the core from damage when the first ply of wire is wound on the core. Uncured elastomer layers are placed between the fabric and first wire ply, and all subsequent wire plies, to insulate them from one another and bond them together. Subsequent to the application of an outer scuff resistant rubber ply the composite of the various layers is vulcanized as a unit to form the finished hose.

High pressure hydraulic hose has been improved but it is still the source of an alarming number of failures in hydraulic circuits, such as those found in heavy earthmoving equipment. One of the reasons for failure is that extruded hose cores are made of a rubber which sacrifices heat resistant characteristics to achieve hardness and rigidity. Further, the first ply of wires often wraps unevenly on the soft extruded core. Further, when the hose is operating at high pressures and temperatures rubber is often extruded between the wires of the first ply and sheared by the movement of the adjacent plies causing pin holes to form in the core which lead to failures. Also the soft, thick-walled extruded core does not have good resistance to radial stresses which makes it difficult to control the angle of the reinforcing wires in applying the wire plies.

Accordingly, it is an object of this invention to provide an improved wire-reinforced hose construction which renders superior performance in high pressure hydraulic circuits without an increase in size and yet having increased flexibility.

These and many other objects are accomplished by a novel hose construction wherein a "hard" core is formed from a laminated tape of an open mesh fabric sandwiched between two layers of uncured elastomer which is wound spirally in an overlapping relationship on a mandrel, then winding a series of wire plies with uncured layers of elastomer between adjacent wire plies, and subsequently vulcanized built-up hose as a unit.

This invention will be better understood by the following description and reference to the accompanying drawings wherein.

FIG. 3 diagrammatcially shows a calendering process used to make the laminated tape from which the core structure is fabricated;

FIG. 4 is a section of a tape wrapping deck for winding the laminated tape on a mandrel;

FIG. 5 is an elevation showing the wire winding decks for winding the core with resilient wires and a tape wrapping deck for applying the outer protective rubber layer or ply; and FIG. 6 shows the winding head of the winding decks in section.

As noted above, it is conventional in hose manufacture to extrude a cylindrical, thick-walled core of rubber or elastomer on a mandrel followed by the addition of a protective fabric tape or braid to form a hose "carcass" on which reinforcing wires are wound to make high pressure hose. The extruded core has been thought to be preferred since it provided a unitary, continuous wall for exposure to high pressure fluid passing through the hose. Further, since the oil resistant elastomer materials, such as neoprene or nitril rubber compounds, used for the core had little tendency to bond or marry with the reinforced wires, the protective fabric layer did not appear to weaken the hose. A laminated core having seams was though to be undesirable since there was the danger of separation of laminates under the influence of high pressure and flexing. Quite commonly, rather thick walled extruded cores have been used to insure adequate strength of the cores due to the irregularities developed during the extrusion process which causes further difficulties in controlling the angle of wire wrap because of the relationship of angle, diameter and lead.

Figure 1:
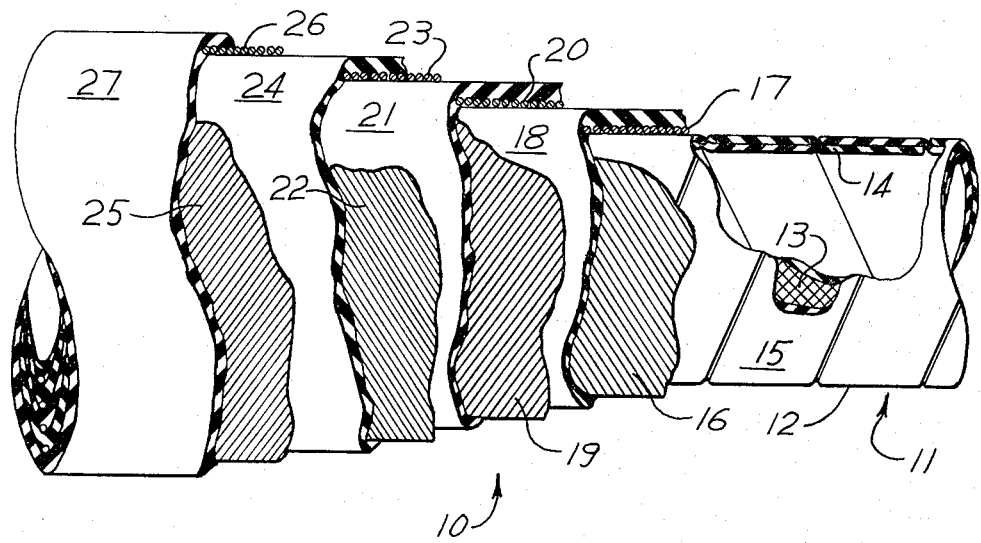
FIG. 1 is an elevation of a portion of the novel hose made according to this invention with plies cut away to show detail.

This invention, as can be seen in FIG. 1, is a radical departure from the conventional techniques of making high pressure hose. The hose 10 in one embodiment has a core 11 composed of laminated tape 12 spirally wrapped in overlapping relationship on a mandrel. An open mesh fabric 13 is sandwiched between a thin layer 14 of oil resisting elastomer and a thin layer 15 of elastomer having good bonding characteristics to wire to form the laminated tape. Alternatively the core could be formed by forming a sandwich of only oil resistant elastomers for both layers 14 and 15 and then applying a very thin coat of wire bonding elastomer on the wrapped core. This totally prevents exposure of the wire bonding elastomer to hydraulic fluids in the finish hose. In either case the inner or oil resistant layer 14 is thicker than the outer layer 15 of the tape. For example, the inner layer 14 could be about .024" in thickness, with the fabric being .010" and the outer layer 15 being .006" in thickness. If the tape is made with both layers of oil resistant elastomer, the wrapped core is subsequently covered with about a .005" layer of wire bonding elastomer before the wires are wound thereon, such as by wrapping or painting it on the core.

Once core 11 is formed by wrapping tape 12 on a mandrel, a wire ply 16 of spirally wrapped wires 17 is wrapped on the core under tension. The fabric 13 prevents the wires from cutting into the core appreciably and the outer layer 15 is so thin the wires will only embed slightly in the core. In this sense the core is "hard" by comparison to prior art extruded cores.

Wires 17 of wire ply 16, as noted, are wound spirally, i.e. in helical convolutions on core 11 which is supported by a mandrel during the winding operation. These wires, as well as the wires used in subsequent plies, are fine, high strength steel wires which are highly resilient and sometimes referred to as stiff "music" quality steel wire. Often they are brass-plated to give better bonding between the elastomer layers and the wire plies.

When wires of this type are spirally wound on core 11, they are placed under tension which causes them to flare outwardly when the hose is cut for attaching fittings, and the like. This undesirable characteristic can be lessened by drawing the wires across a die to "work" the wires sufficiently to induce a helical "set" or "curl" which gives the wires a shape in a neutral lie somewhat akin to the configuration they will have in the finished hose carcass, a practice which is common in the hose making art.

It can be theoretically demonstrated mathematically that the desirable angle of the helical convolutions the individual wires in a wire ply should have from the hose axis is 54° 44'. This angle allows the ply to give the best retention against both axial and radial expansion of the hose in high pressure operations. Thus, it is the practice to wrap the wires at an angle close to the theoretical angle to obtain better performing hose. Often the angle in conventional hose varies sharply from the theoretical angle due to variations in core size, stack-up tolerances in the wire winding equipment and variations in diameter in the wire plies. Because of these variations, hose manufacturers often wrap some of the wire plies at a greater angle and some at a smaller to obtain a mean of approximately 54° 44'. This allows some plies to slide along one another during pressure changes causing pin holing and hose breakdown. Further, if all the plies are wrapped at an angle greater or lesser than 54° 44' the hose is unserviceable in high pressure operations since ply movement is extreme.

After wire ply 16 has been wrapped on core 11 which has little deviation in diameter because of its "hard" character, a layer 18 of uncured elastomer is placed over this ply before a second wire ply 19 is wound on the partially built-up hose structure. The wires 20 in this second wire ply are wound at an equal angle as that of the inner ply, but with an opposite angle so that these wires will angularly cross the wires of the previous ply, as can be seen in FIG. 1. Wire ply 16 forms a hard base upon which next ply can be wound.

The build up of hose 10 is continued in the above manner by adding another layer 21 of uncured elastomer and then following it with a third wire ply 22 which has the angle of its wires 23 wound at the same angle as the innermost, or first wire ply 16. Likewise this third ply is covered with an uncured layer 24 of elastomer and a fourth wire ply 25 is wound thereon with its wires 26 having the same angle as those in the second ply. Once the requisite number of plies has been wound on the core, a rubber scuff covering 27 is applied to protect the outer wire ply of the hose.

Figure 2:
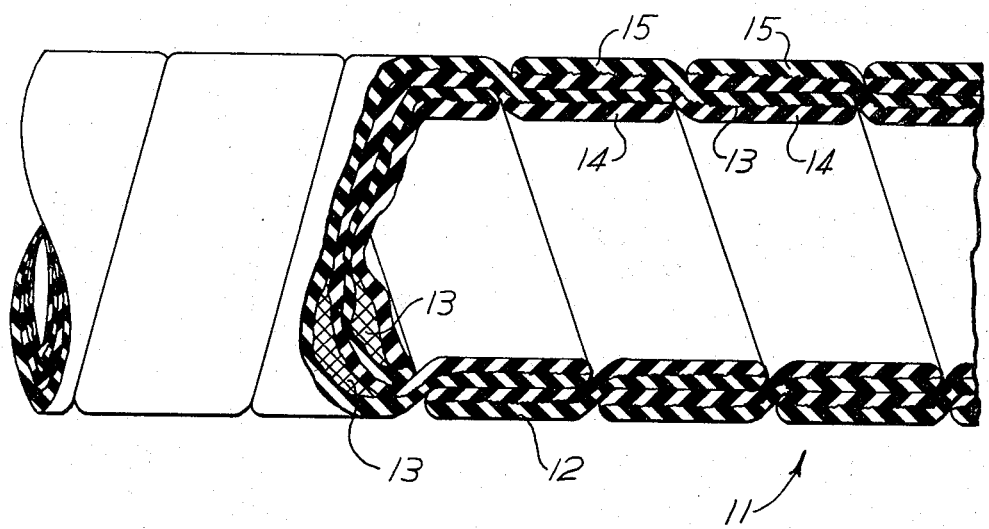
FIG. 2 shows the novel core structure of the hose in elevation partly broken away to show the overlapped relationship of the tape.

As can be seen in FIG. 2, the mesh of the fabric 13 is open and the layer 14 of the oil-resistant elastomer on one side of the fabric can actually bond to the layer 15 of wire bonding elastomer through the open mesh in the fabric. Because of this interbonding feature the fabric is embedded in an elastomer sandwich which makes an extremely strong and "hard" tape for forming the core 11 of this new hose construction. It is believed this interbonding of the two layers whether they be the same kind of elastomer or different kinds through the open mesh fabric is partially responsible for the superior performance of the hose made according to this invention.

The laminated tape 12 formed by a calendering process, discussed later, is wound in overlapping relationship on a mandrel, with a lap preferably equal to at least one-half the width of the tape, as shown in FIG. 2. With this amount of lap a double fabric layer is present in the core for high radial strength and because of this, pressures within the hose will not cause portions of the core to be extruded where there are irregularities in the wire ply 16, unless they are large, which nearly eliminates any tendency for pin holing. Of course, the tape is wrapped so the thinner layer of wire bonding elastomer will be on the outside of the core with the thicker oil-resistant layer on the inside if two kinds of elastomers are used. Further, it is possible to use a triple lap on the core in place of the double lap to increase its radial strength.

While the layer of oil-resistant elastomer does not bond readily to fabric 13 or wires 17, it does bond well to other elastomers, such as the wire bonding elastomer. Due to the open mesh in the fabric it has been found that the core fabricated by winding laminated tape 12 in overlapping relationship and followed by winding a wire ply 16 thereon will insure that the inner heterogeneous plies of the hose form a unitary, integral unit when vulcanized. Only a thin walled wrapped core 11 is required to form hose according to this invention since the construction makes its core considerably stronger than those obtained by extruded fabric covered cores and the new core need be only one-half or less the wall thickness of extruded cores for the same service pressure.

By the use of the thin core 11 without the addition of protective braids wrapped thereover, the wires in the reinforcing plies are moved closer to the center of the hose wherein, for a given tensile load, they will be better able to resist the stresses than if their mean core diameter were greater. Also, less wire is required. Further, it was found that the core structure manufactured as described above, was so adequate that the service pressure of the hose could be increased by merely increasing the size of the wires in the wire plies rather than the addition of a greater number of plies. Couplings are also retained better on the novel hose since the "harder" core is more resistant in compression than the softer extruded cores.

A method of making the laminated tape 12 used to form the core 11 of this novel hose, is a calendering operation disclosed in FIG. 3. In this method an oil-resistant elastomer stock 30 is placed between two calendering rollers 31 and 32 which are rotated into one another, as indicated by the arrows. Roller 31 turns much slower than roller 32 so a thin layer 14 of elastomer is frictioned from the stock and adheres to the surface of roller 32. Simultaneously a wire bondable elastomer stock or other elastomer stock 33 is being frictioned in a like manner between rollers 34 and 35 so that a very thin layer 15 adheres to the faster moving roller 35. Rollers 32 and 35 are closely spaced to one another and timed to rotate at the identical speed so that the layers of elastomer adhering to their respective surfaces are brought together between them at a uniform rate. A strip of open mesh fabric 13 is inserted between the layers of elastomer as they are compressed into a laminate between rollers 32 and 35. In this manner the thin laminated tape is formed and is wound onto reels with a wax separator paper 36 to prevent the courses of tape from sticking for use in making the novel core structure.

The laminated tape 12 is wound in a spiral, overlapping relationship on mandrel 40 from a storage reel 41 from a wrapping deck 42 to form the core 11, as shown in FIG. 4. The arm 43 holding the reel can be changed in its angular relationship to the deck by adjusting mechanism 44 so that it is able to handle different widths of tape. The mandrel 40 is axially advanced through the aperture 45 in the wrapping deck as the latter is rotated to obtain the desired lap.

The fabric 13 adds resistance to stretching but allows a certain amount of stretching so the tape 12 will conform to the mandrel when wrapping the core 11. The open mesh gives the tape good draping ability when wrapped on the mandrel and the laminated core is actually harder, as mentioned above than extruded cores. By harder, it is meant to convey the concept that the thin laminated core structure is resistant to cutting and changes in diameter when wire is wound thereon under tension. Due to this characteristics, wire wound directly on the core will not embed deeply into this core structure as would be the case in extruded cores which use protective fabric braids over the core to prevent this from occurring. Further, the laminated core has a much higher compressive modulus which allows shorter couplings to be employed on the finished hose, which are not practical in hoses with extruded cores due to the softness of the wall structure.

With core 11 wound on mandrel 40 it is pulled over guide roller 50 by an advancing drive (not shown) through the wire winding apparatus shown in FIG. 5. The mandrel passes through the bore of the winding head 51 of the first wire winding deck 52. The winding head trains a plurality of the stiff, resilient wires 17 on the core so they are wrapped in a parallel, side-by-side relationship in wire ply 16 at an angle as determined by the axial speed of the mandrel through the winding head. This angle is substantially 54° 44'.

Subsequent to the mandrel's passage through the first wire winding deck 52, a layer 18 of elastomer is placed over wire ply 16 by the action of rollers 53 and 54 and the mandrel containing a partially built hose then passes through winding head 55 of the second wire winding deck 56 which rotates in a direction opposite to that of the first wire winding deck 52. From the winding head on the second wire winding deck a plurality of wires 20 is wound on elastomer layer 18 in an angle of substantially 54° 44' but on opposite angle to that of wire ply 16. In FIG. 5 an outer protective elastomer ply 27 is wound on wire ply 19 formed as the hose passes through the second winding deck after the mandrel proceeds over guide rollers 57 by a wrapping deck 58. Only two plies are shown in FIG. 5, since this is adequate to illustrate the invention, and additional plies will be formed in the same manner alternating the angle of the wire in adjacent plies. Also, a separate wrapping machine may be used to apply the outer scuff-resistant ply.

Winding head 51 which is illustrative of those on all the winding decks, is shown in detail in FIG. 6. It has a cylindrical body 60 composed of a radially projecting mounting flange 61 for mounting it on the winding decks, and a projecting, cylindrical collar 62 attached to the flange. The collar has a plurality of radical holes 63 drilled therethrough in a single plane which allow wires from spools mounted on the winding decks to pass into the winding head.

The winding head 51 is described with reference to the first wire winding deck 52 and its operation is described relative to applying the first wire ply 16. However, it should be appreciated that this is illustrative of how the subsequent plies are wound as well.

Wires 17 pass through the radial holes 63 in the winding head 51 to the inside of the collar 62 and are forced against a small radius formed about the inner aperture of the radial holes by a smooth nose piece 64 carried on a threaded boss 65. This boss can be screwed in and out of the bore of the collar to vary the pressure of the wires on their respective radii.

The nose piece 64 accomplishes two functions. It puts a curl or helical set in the wire by working the wires against the radii on the inner aperture of the radial holes, and simultaneously maintains tension on the wires as they are pulled through the winding head by the axially advancing mandrel and the winding action induced by the rotation of the wire winding deck 52. It should be appreciated in this manufacture the winding decks themselves are rotated while the mandrel is axially advanced through the winding heads of the winding decks. Even though the wires are tensioned by being forced against their respective radii they will not embed into the outer layer 15 of core 11 to any appreciable extent since the core is relatively hard, as discussed before. This causes the diameter of the wire ply to be relatively uniform throughout the length of the hose, and there is no need to change the angle of the subsequent wire plies above and below the theoretical desirable angle of 54° 44' to compensate for variations in the diameter of the individual wire plies which changes the angle.

By proportioning the rate of axial advance of the mandrel and the rotational speed of the deck, the wires 17, which are carried on spools revolving with the winding decks, are wound in side-by-side convolutions with an angle of about 54° 44' relative to the hose axis, and usually within plus or minus ½° from the theoretical angle when using the hard laminate core of this invention.

One of the most important features of the thin laminated core 11 is that it permits close control of the outside diameter of the core structure, and is sufficiently rigid or hard so that wire wrapped thereon will form a smooth, cylindrical ply with little deviation in diameter. Alternatively, if a soft, extruded core is used with a fabric protective braid, the wires are pulled into the core at different depths along the core causing irregularities in the diameter of the ply and weakness in the hose. This weakness develops because the rubber of the extruded core is actually extruded between the wire plies as they are wound thereon under tension and variations from the desirable pitch angle is caused by the variation in diameter. It is impossible to control the angle of the wires in an individual ply when the diameter is varying since the angle, diameter and lead are all related to one another and changes in the diameter necessarily effect changes in the angle, which cannot be detected by the winding equipment. With a laminated liner or core formed according to this invention, the angle can be more precisely controlled near 54° 44' since the variation in diameter is very slight.

Performance-wise a twenty foot length of hose made according to this invention was tested by pulsating it with fluid from zero to its service pressure. When this was done the hose showed no tendency to move or elongate. However, a similar twenty foot length of conventional hose having an extruded core, but otherwise made in the same manner, when subjected to the same pressure and cycles, elongated approximately ten inches and "snaked" violently when the pressure was cycled. Further, the hose made according to the instant invention had a smaller outside diameter with the same inside diameter as the conventional hose with the extruded core. Its flexibility was also very superior.

Usually, after the hose has been prepared as described above, it is wrapped with a nylon shrink tape and heated to vulcanize the hose together as an integral unit. Nylon shrink tape is often used in order to compress the hose against the mandrel during the vulcanizing operation.

Also, while the desirable angle of the individual wire plies is 54° 44' it is not always possible to wrap precisely at this angle. For this reason it can vary about 1° on either side of the desirable theoretical angle. However, the angle of all the plies must not be below or above the theoretical since the mean angle will not approach the theoretical. The angle is measured with reference to the hose axis. Also for convenience the angle of the first course is generally referred to as being a forward angle, while that of the second course is referred to as a reverse angle, meaning that the next adjacent wire ply is measured in the opposite direction, clockwise or counter-clockwise, from the hose axis with relation to the direction of the angle of the next adjacent wire ply. Of course, the angle changes from forward to reverse for each succeeding ply.

The hose made according to this invention is dynamically balanced since all the wire plies are wrapped at or very near the theoretical angle of 54° 44′ and thus will not move when the hose is pressurized. Hose wherein the wire plies are wrapped above and below the theroetical angle will be unbalanced having the plies moving relative to one another as each moves toward the theoretical angle when strained. As temperatures increase the elastomers become softer and movement between the plies is accentuated, increasing pin holing.

What is claimed is:

1. A method of making flexible wire-reinforced rubber hose on a mandrel wherein the mandrel is removed when the hose is completed comprising:
   (a) forming a laminated tape, said tape having two thin layers of uncured elastomers with an open mesh fabric sandwiched therebetween;
   (b) wrapping said laminated tape in overlapping relationship on a mandrel to form a core;
   (c) winding a plurality of resilient wires on said core in parallel side-by-side helical convolutions to form a cylindrical wire ply having a wall thickness equivalent to the diameter of said wires;
   (d) covering said cylindrical wire ply with a skin of uncured elastomer;
   (e) winding a plurality of resilient wires on said skin in parallel side-by-side helical convolutions to form a second cylindrical wire ply having a wall thickness equal to the diameter of said wires, said helical convolutions of said second ply being wound at an angle opposite to the winding angle of said first ply so said wires in said second cylindrical wire ply cross those of said first wire ply; and
   (f) subsequently vulcanizing the built-up hose by heating it.

2. A method as defined in claim 1 wherein the laminated tape is formed from two different elastomers, one being an oil resistant elastomer and the other being an elastomer capable of bonding to wires, with the fabric sandwiched therebetween.

3. The method as defined in claim 2 wherein the mesh of the fabric is of a sufficient size to allow interbonding between the layers of elastomer on either side thereof.

4. The method as defined in claim 2 wherein the laminated tape is wrapped in an overlapping relationship with a lap equal to at least one-half of the width of said tape when wrapping it on the mandrel.

5. The method as defined in claim 4 wherein the resilient wires wound during the manufacture of the hose are tensioned and worked over a small radius to give them a helical set similar to that which they will have in the finished hose.

6. The method as defined in claim 5 wherein the angle of the wires in the wire plies is substantially 54° 44′ with reference to the hose axis.

7. The method as defined in claim 1 wherein the individual layers of rubber and fabric which compose the tape have a thickness of less than .04 inch.

8. A flexible wire-reinforced rubber hose comprising a tubular core formed by wrapping in overlapping relationship a laminated tape composed of two layers of elastomer with an open mesh fabric sandwiched therebetween and at least two mutually concentric wire plies separated by a skin of elastomer, each consisting of a multiplicity of individual resilient flexible helical shaped wires wound in parallel, side-by-side convolutions, said first concentric wire ply being wound on said core with an angle within ½° of 54° 44′ with reference to the hose axis and said next adjacent concentric ply being wound with an opposite angle of equal magnitude to cross said first ply.

9. The flexible wire-reinforced hose as defined in claim 8 wherein the outside layer of the laminated tape is an elastomer capable of bonding to the resilient wires and the inside layer is an oil resistant elastomer with the two layers interbonding through the mesh of the fabric.

10. The hose as defined in claim 8 wherein the laminated tape forming the core is composed of rubber and fabric layers each having a thickness of less than .04 inch.

References Cited

UNITED STATES PATENTS

| 1,831,724 | 11/1931 | Stokes | 138—130 |
| 2,670,762 | 3/1954 | Stivason | 138—138 |
| 2,690,769 | 10/1954 | Brown | 138—128 |
| 2,969,812 | 1/1961 | De Ganahc. | |
| 3,223,565 | 12/1965 | Fritz. | |

FOREIGN PATENTS

| 717,596 | 1/1942 | Germany. |
| 1,157,862 | 11/1963 | Germany. |
| 549,902 | 12/1942 | Great Britain. |

LAVERNE D. GEIGER, *Primary Examiner.*

C. L. HOUCK, *Assistant Examiner.*